(12) United States Patent
Lee et al.

(10) Patent No.: US 11,525,582 B2
(45) Date of Patent: Dec. 13, 2022

(54) COOKING APPLIANCE (71) Applicant: LG Electronics Inc., Seoul (KR)

(72) Inventors: Suyong Lee, Seoul (KR); Jaekyung Yang, Seoul (KR); Yongsoo Lee, Seoul (KR); Yonghyun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 488 days.

(21) Appl. No.: 16/614,256

(22) PCT Filed: May 16, 2018

(86) PCT No.: PCT/KR2018/005639
§ 371 (c)(1),
(2) Date: Nov. 15, 2019

(87) PCT Pub. No.: WO2018/212601
PCT Pub. Date: Nov. 22, 2018

(65) Prior Publication Data
US 2020/0088415 A1   Mar. 19, 2020

(30) Foreign Application Priority Data

May 17, 2017  (KR) .................. 10-2017-0060997

(51) Int. Cl.
*H05B 3/20* (2006.01)
*A47J 27/14* (2006.01)
(Continued)

(52) U.S. Cl.
CPC ............ *F24C 15/166* (2013.01); *A47J 27/04* (2013.01); *F24C 7/067* (2013.01); *F24C 15/003* (2013.01);
(Continued)

(58) Field of Classification Search
CPC ......... H05B 3/20; A47J 37/0623; A47J 37/00; A47J 27/04; A47J 27/14–17; F24C 13/00; F24C 15/16; F24C 15/166; F24C 15/003
See application file for complete search history.

(56) References Cited

U.S. PATENT DOCUMENTS

| 8,369,695 B2 * | 2/2013 | Lee ...................... F24C 15/327 |
| | | 392/394 |
| 2007/0114221 A1 | 5/2007 | Shon et al. |
| 2010/0054717 A1 | 3/2010 | Lee et al. |

FOREIGN PATENT DOCUMENTS

| JP | 2003336846 | 11/2003 |
| JP | 2017016984 | 1/2017 |

(Continued)

OTHER PUBLICATIONS

Extended European Search Report in EP Appln. No. 18801596.0, dated Jan. 21, 2021, 8 pages.
(Continued)

*Primary Examiner* — Michael A Laflame, Jr.
(74) *Attorney, Agent, or Firm* — Fish & Richardson P.C.

(57) ABSTRACT

A cooking appliance according to an embodiment of the present invention comprises: a case having a cooking chamber formed therein; a door for opening/closing a front opening of the case; a steam generation device mounted on the exterior of the case; and a steam supply pipe for connecting the steam generation device and the cooking chamber, wherein the steam generation device can comprise: a housing fixed to the case; a drawer provided so as to be able to be withdrawn from and put into the housing, and into which water for generating steam is filled; and a heating unit mounted on the lower surface of the drawer so as to heat the water filled inside the drawer.

9 Claims, 12 Drawing Sheets

(51) Int. Cl.
    *A47J 27/04*     (2006.01)
    *F24C 13/00*     (2006.01)
    *F24C 15/16*     (2006.01)
    *F24C 7/06*     (2006.01)
    *F24C 15/00*     (2006.01)

(52) U.S. Cl.
    CPC ........... *H05B 3/20* (2013.01); *A47J 2027/043* (2013.01); *H05B 2203/013* (2013.01)

(56) References Cited

FOREIGN PATENT DOCUMENTS

| KR | 1020060127674 | 12/2006 |
|----|---------------|---------|
| KR | 1020060132211 | 12/2006 |
| KR | 1020070054997 | 5/2007  |
| KR | 100794597     | 1/2008  |
| KR | 100805227     | 2/2008  |
| KR | 1020100012726 | 2/2010  |
| WO | WO2008082070  | 7/2008  |

OTHER PUBLICATIONS

International Search Report in International Application No. PCT/KR2018/005639, dated Aug. 24, 2018, 4 pages.

\* cited by examiner

COOKING APPLIANCE

CROSS-REFERENCE TO RELATED APPLICATIONS

This application is a National Stage application under 35 U.S.C. § 371 of International Application No. PCT/KR2018/005639, filed on May 16, 2018, which claims the benefit of Korean Patent Application No. 10-2017-0060997, filed on May 17, 2017. The disclosures of the prior applications are incorporated by reference in their entirety.

TECHNICAL FIELD

The present invention relates to a cooking appliance.

BACKGROUND ART

Generally, a cooking appliance is a household appliance for cooking food and includes an electric oven, a microwave, and the like.

In particular, an electric oven is a device which cooks by confining water vapor generated from food together with heat in the oven and then heating to high temperature.

Recently, many cooking appliances including a steam supply device for supplying steam into a cooking space, such as a steam oven, have been released. By supplying steam into the cooking space, various dishes including steamed dishes are possible.

As the related art, Korean Patent Publication No. 2007-0054997 (May 30, 2007) discloses a cooking appliance equipped with a steam supply device. The cooking appliance disclosed in the related art includes a steam generating device, a water supply tank and a water feed pump for supplying water to the steam generating device, and a planar heating heater fixedly mounted to the steam generating device.

However, the cooking appliance with the steam supply device disclosed in the related art has the following disadvantages. First, since the steam generating device and the water supply tank for supplying water to the steam generating device are separated from each other, a water supply pump must be provided on a flow path connecting the water supply tank and the steam generating device. Therefore, since a space for receiving the water supply tank, the water supply pump, and the steam generating device is required inside the cooking appliance, there is a disadvantage that the overall volume of the cooking appliance increases.

Therefore, there is a disadvantage that the cooking chamber volume formed in the cooking appliance having the steam generating device compared to the cooking appliance of the same size may be smaller than the cooking chamber volume formed in the cooking appliance without the steam generating device.

Second, in a case of the cooking appliance disclosed in the related art below, the steam generating device is fixedly mounted on the outer upper surface of the cooking chamber. Therefore, there is a disadvantage that the cleaning and repair of the inside of the steam generating device are not easy.

Third, since the water supply tank and the steam generating spaces of the steam generating device are in separate spaces, there is a disadvantage that the total time of the sum of the time for filling the water supply tank with water, the time for moving the water from the water supply tank to the steam generating space by driving the water supply pump, and the time to heat the water filled in the steam generating space becomes long.

DISCLOSURE

Technical Problem

The present invention is proposed to improve the above problems.

Technical Solution

In order to achieve the above object, a cooking appliance according to an embodiment of the present invention includes a case forming a cooking chamber therein, a door opening or closing a front opening of the case; a steam generator mounted on an outer surface of the case; and a steam supply tube connecting the steam generator and the cooking chamber to each other, in which the steam generator may include a housing fixed to the case; a drawer withdrawably provided to the housing, the drawer configured to be filled with water for steam generation; and a heater mounted on a lower surface of the drawer so as to heat water filled in the drawer.

The drawer may include a case configured to be filled with water for steam generation, a case cover configured to cover an upper surface of the case, the case being configured to have a water injection hole at one side thereof, and an injection hole cover configured to open or close the water injection hole.

The heater may include a planar heating element configured to include an insulating substrate and a heating resistor pattern-printed on the insulating substrate; cables extending from both end portions of the heating resistor; and terminals respectively connected to end portions of the cables.

A bottom portion of the case includes a first surface configured to be in direct contact with water filled in the case; and a second surface configured to correspond to an opposite surface of the first surface, in which the planar heating element is attached to the second surface, and at least the bottom portion of the case is formed of metal material.

An opening is formed at the bottom portion of the case, the opening is shielded by a heat conduction plate, the heat conduction plate includes a first surface configured to be in direct contact with water filled in the case; and a second surface configured to correspond to an opposite surface of the first surface, the planar heating element is attached to the second surface, and the case is formed of non-metal material.

The cooking appliance according to an embodiment of the present invention further includes power terminals mounted to a rear surface of the housing, and the power terminals are electrically connected to the terminals when the drawer is completely inserted into the housing.

Each of the terminals may include a case-side contact terminal connected to an end portion of each of the cables, a waterproof member encircling to protect the case-side contact terminal; and each of the power terminals may include a terminal protector mounted on the rear surface of the housing; and a housing-side contact terminal protruding from a center of a front surface of the terminal protector so as to selectively be in contact with the case-side contact terminal.

The waterproof member may include an inner lip encircling to protect the case-side contact terminal, and an outer lip formed on an outer side of the inner lip, the outer lip having one or more slits.

When the drawer is completely inserted into the housing, a front end portion of the terminal protector presses a rear surface of the waterproof member, when the rear surface of the waterproof member is pressed, the slits are opened while the shape of the waterproof member is deformed, and the case-side contact terminal is exposed to an outside through the opened portion of the slits to contact the housing-side contact terminal.

When the force pressing the rear surface of the waterproof member is removed, the waterproof member is restored to an original shape thereof, to close the slits.

Advantageous Effect

The cooking device according to an embodiment of the present disclosure having the above configuration has the following effects.

First, since the drawer of the steam generating device has the functions of the water supply tank and the steam generating unit, there is no need for a separate water supply tank and a water supply pump. Therefore, there is an advantage that the cooking chamber space can be widened by the volume occupied by the water supply tank and the water supply pump.

Second, since the drawer of the steam generating device is removed to fill the water and mounted on the housing and the heating function can be directly operated, there is an effect that the time required to fill the water and generate steam is reduced. In other words, there is an advantage that the time taken for water to be filled and moved from the water supply tank to the steam generating device is shortened.

Third, since the drawer on which the heating unit is mounted is freely detachable from the housing, there is an advantage that the drawer can be easily cleaned and repaired.

Fourth, since it is possible to remove the drawer equipped with the heating unit, there is an advantage that the replacement and repair of the heating unit can be made easily.

BEST MODE

Figure 1:
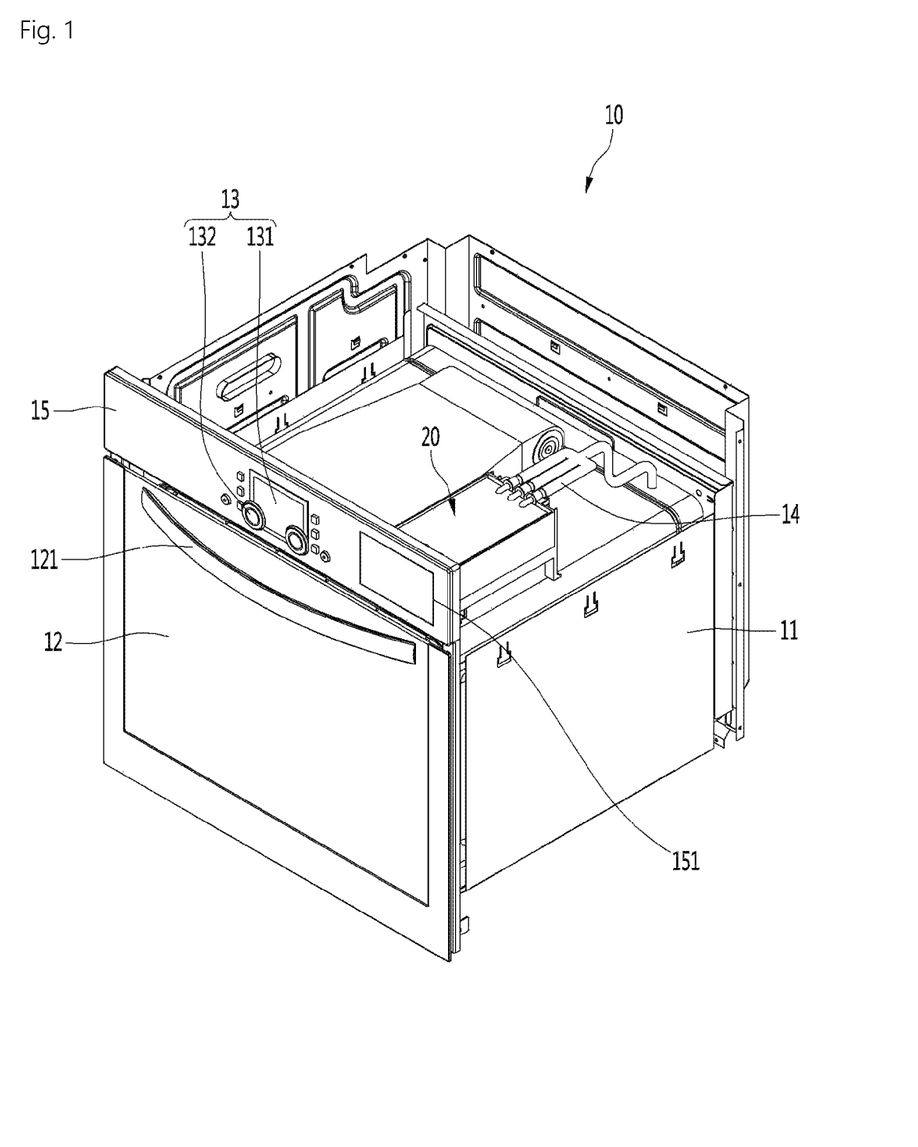
FIG. 1 is a perspective view illustrating a cooking appliance equipped with a steam generating device according to an embodiment of the present invention.

FIG. 1 is a perspective view illustrating a cooking appliance equipped with a steam generating device according to an embodiment of the present invention.

Referring to FIG. 1, a cooking appliance 10 according to an embodiment of the present invention may include a case 11 having a cooking chamber formed therein and having a front opening, a steam generating device 20 which is disposed at a left side or a right side of an upper surface of the case 11, a door 12 selectively opening or closing the opened front surface of the case 11, a decor panel 15 installed on the front surface of the case 11 corresponding to the upper side of the door 12, and a control panel 13 provided on the decor panel 15.

In addition, the front surface of the door 12 is provided with a door handle 121, and the door 12 may be rotatably coupled to a lower end of a front surface of the case 11 by a hinge.

In addition, the control panel 13 may include an operation unit 132 for inputting various commands, and a display unit 131 illustrating a command input by the operation unit 132 or an operation state of the cooking appliance 10.

In addition, a drawer insertion hole 151 is formed at an edge of the decor panel 15 corresponding to the position of the steam generating device 20 to be capable of perform withdrawal of the drawer (described later) constituting the steam generating device 20.

In addition, a steam supply tube 14 is connected to the rear surface of the steam generating device 20. The steam supply tube 14 is connected to the cooking chamber inside the case 11 so that steam generated by the steam generating device 20 is supplied into the cooking chamber.

Figure 2:
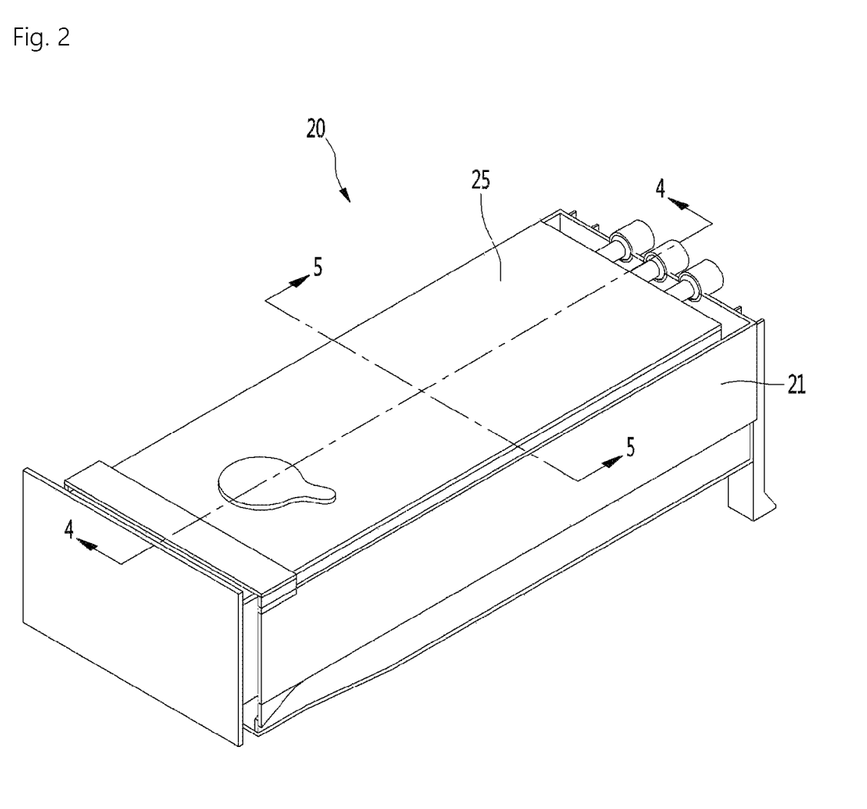
FIG. 2 is a perspective view illustrating a steam generating device according to an embodiment of the present disclosure.
Figure 3:
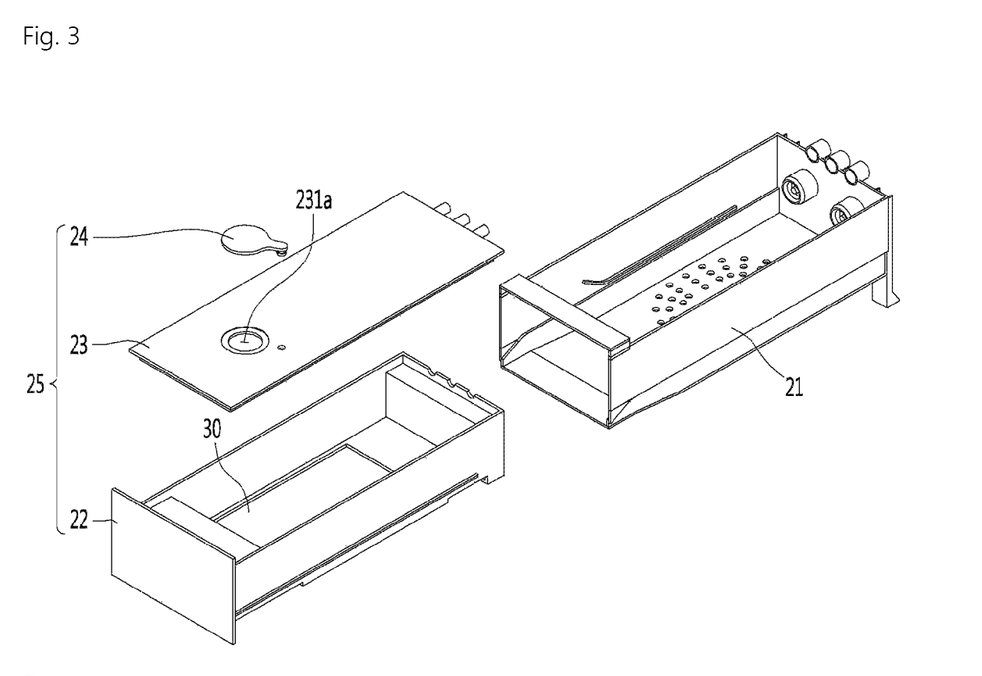
FIG. 3 is an exploded perspective view illustrating the steam generating device.
Figure 4:
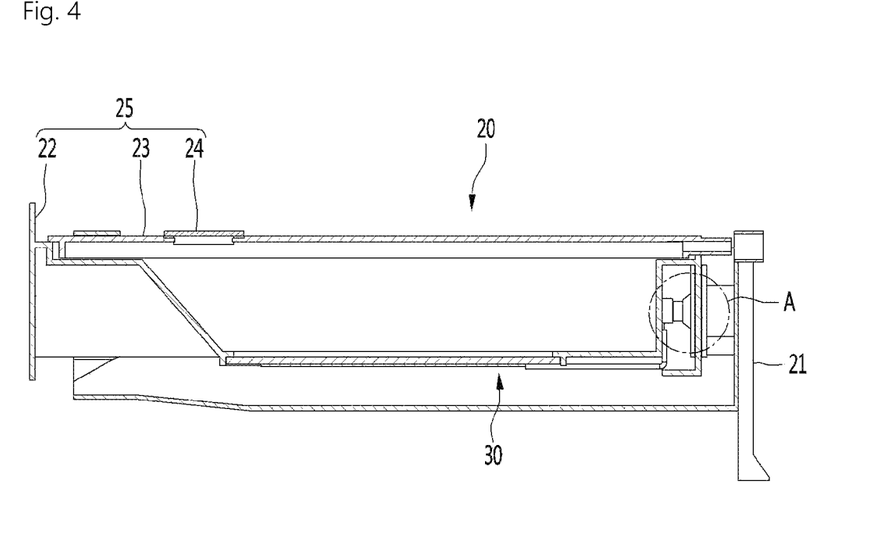
FIG. 4 is a longitudinal sectional view illustrated a steam generating device taken along line 4-4 of FIG. 2.
Figure 5:
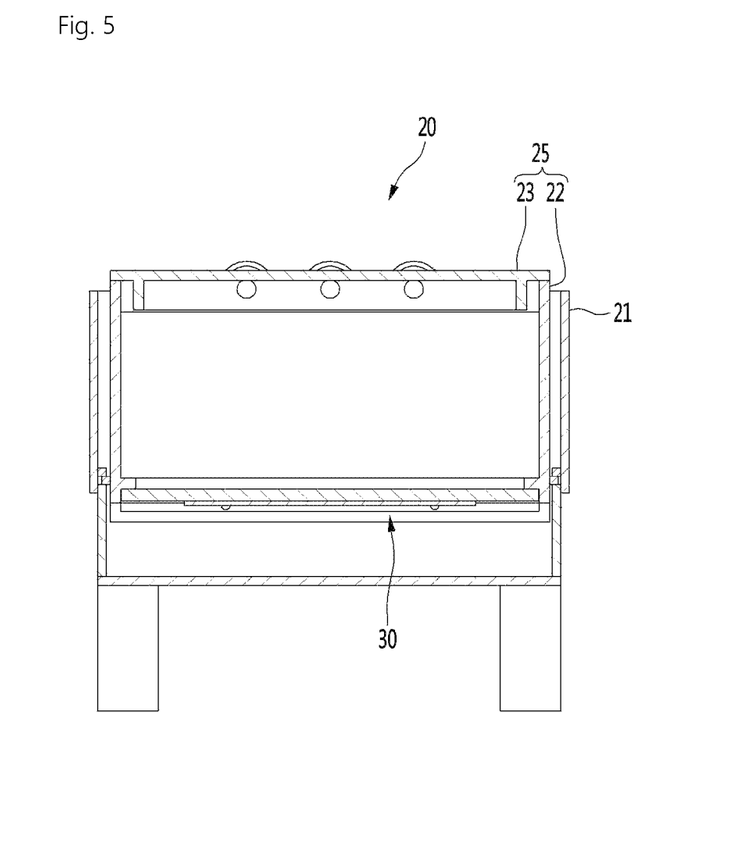
FIG. 5 is a longitudinal sectional view illustrated a steam generating device taken along line 5-5 of FIG. 2.

FIG. 2 is a perspective view illustrating a steam generating device according to an embodiment of the present disclosure, FIG. 3 is an exploded perspective view illustrating the steam generating device, FIG. 4 is a longitudinal sectional view illustrated a steam generating device taken along line 4-4 of FIG. 2, and FIG. 5 is a longitudinal sectional view illustrated a steam generating device taken along line 5-5 of FIG. 2.

Referring to FIGS. 2 to 5, the steam generating device 20 according to the embodiment of the present disclosure includes a housing 21 fixed to an upper surface of the case 11, a drawer 25 slidingly inserted into the housing 21, and a heating unit 30 mounted on the bottom of the drawer 25 to generate heat.

In detail, the drawer 25 may include a case 22 filled with water for steam generation therein, a case cover 23 covering the opened upper surface of the case 22, and an injection hole cover covering the water injection hole 231 formed in the case cover 23. The heating unit 30 is mounted on the bottom surface of the case 22.

The drawer 25 may slide in or out of the housing 21 through the opened front surface of the housing 21.

Hereinafter, the structure and function of each component constituting the steam generating device 20 will be described in more detail with reference to the accompanying drawings.

Figure 6:
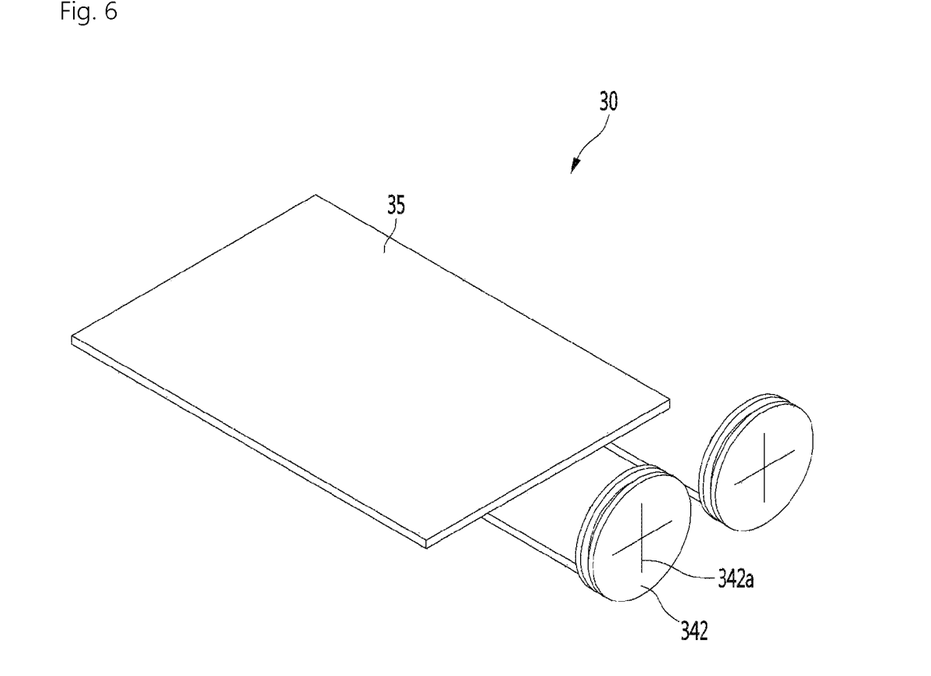
FIG. 6 is a perspective view illustrated a heating unit provided in the steam generating device according to an embodiment of the present disclosure viewed from the upper rear side.
Figure 7:
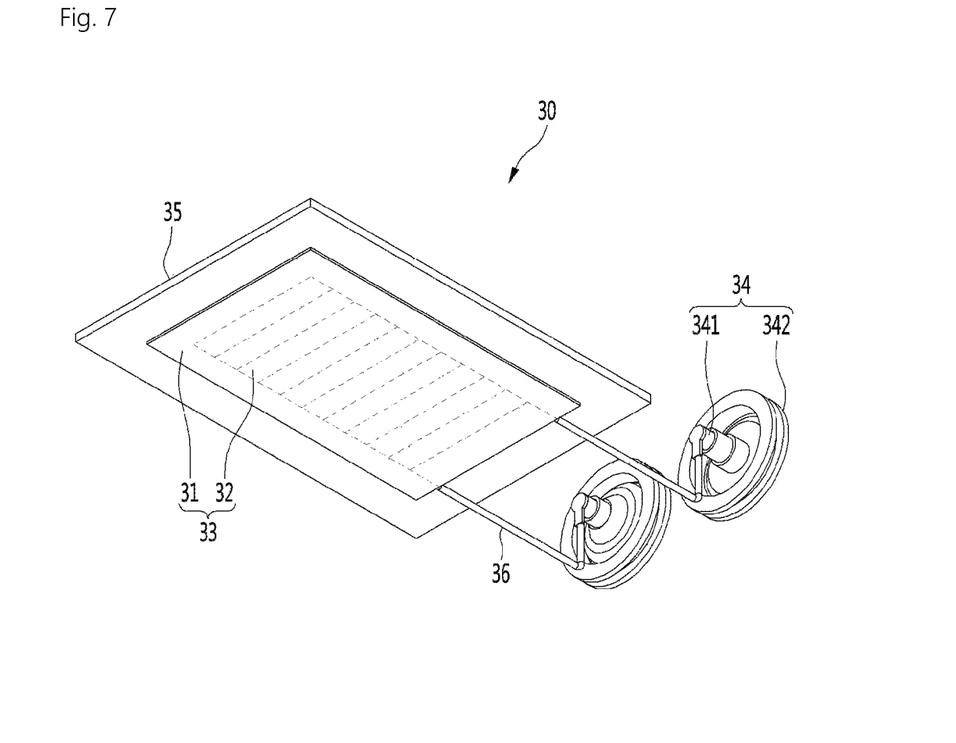
FIG. 7 is a bottom perspective view illustrating the heating unit.

FIG. 6 is a perspective view illustrated a heating unit provided in the steam generating device according to an embodiment of the present disclosure viewed from the upper rear side and FIG. 7 is a bottom perspective view illustrating the heating unit.

Referring to FIGS. 6 and 7, the heating unit 30 constituting the steam generating device 20 according to the embodiment of the present disclosure may include a planar heating element 33, a cable 36 extending from the planar heating element 33, a terminal portion 34 connected to an end portion of the cable 36, and a heat conduction plate 35 to which the planar heating element 33 is attached to a bottom surface thereof.

In detail, the heat conductive plate 35 may be a metal plate having a high heat conductivity coefficient, for example, an aluminum plate. In addition, the heat conductive plate 35 may form a portion of the bottom of the case 22 constituting the drawer 25. However, the planar heating element 33 may be attached directly to the bottom of the case 22.

In more detail, the planar heating element 33 includes an insulating substrate 31 and a heat generating resistor 32 pattern-printed on the insulating substrate 31. In addition, both end portions of the heating resistor 32 pattern-printed on the insulating substrate 31 are connected to the pair of cables 36, respectively.

In addition, the terminal portion 34 connected to the end portion of the cable 36 may include a contact terminal 341 and a waterproof member 342 encircling to protect the contact terminal 341.

In detail, since the contact terminal 341 is encircled by the waterproof member 342, it can be prevented a phenomenon that water may contact the contact terminal 341 during the cleaning of the drawer 25.

In addition, the waterproof member 342 may be made of rubber or silicone material, it may be made of a disc shape. In addition, one or a plurality of slits 342a may be formed inside the waterproof member 342. The waterproof member 342 is mounted on the rear surface of the case 22. The structure and function of the waterproof member 342 will be described in more detail with reference to the drawings below.

Figure 8:
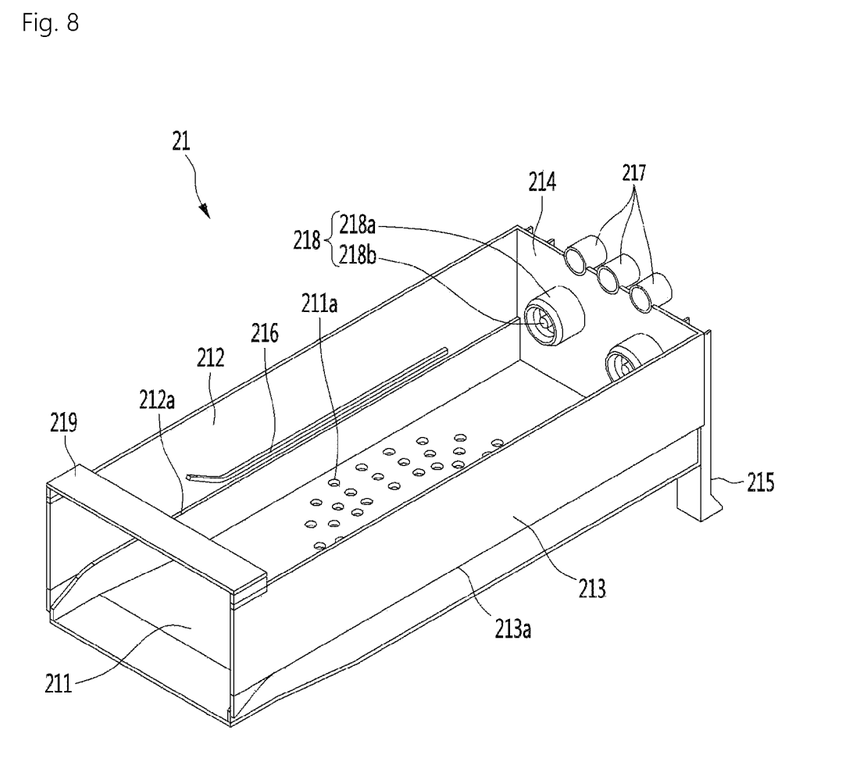
FIG. 8 is a perspective view illustrating a housing constituting a steam generating device according to an embodiment of the present disclosure.

FIG. 8 is a perspective view illustrating a housing constituting a steam generating device according to an embodiment of the present disclosure.

Referring to FIG. 8, it may include a drawer 25 and a housing 21 into which the drawer 25 is slidingly inserted.

In detail, the front surface of the housing 21 is opened for withdrawal of the drawer 25. In addition, an upper surface of the housing 21 may also be opened but is not limited thereto.

The housing 21 includes a bottom portion 211, a left side portion 212 and a right side portion 213 extending upward from left and right edges of the bottom portion 211, and a rear portion 214 connecting rear ends of the bottom portion 211, the left side portion 212, and the right side portion 213.

In addition, a plurality of heat dissipation holes 211a may be formed in the bottom portion 211, and the heating unit 30 may be disposed on the upper side of the plurality of heat dissipation holes 211a. Therefore, the surface of the outer case constituting the heating unit 30 and the drawer 25 can be cooled by external air flowing through the plurality of heat dissipation holes 211a while the steam generation is stopped.

In addition, the guide ribs 216 extend in the front and rear directions of the housing 211 on the inner surfaces of the left side portion 212 and the right side portion 213, respectively. In addition, guide jaws 212a and 213a are formed to be stepped at any point of the left side portion 212 and the right side portion 213 corresponding to the lower side of the guide rib 216. Then, the slide rail 228 (see FIG. 9) of the drawer 26 to be described later is inserted into the rail receiving space formed between the guide rib 216 and the guide jaw 212a.

In detail, a portion of the guide rib 216 may be inclined upward toward the front end portion of the housing 21 to allow the slide rail 228 to be inserted smoothly into the rail receiving space.

In addition, the guide jaw 212a and 213a may be formed by stepping a portion of the left side portion 212 and the right side portion 213 toward the center of the housing 21. The guide jaws 212a and 213a may be formed to have a length from the front end portion to the rear end portion of the left side portion 212 and the right side portion 213. The width (or stepped depth) of the guide jaws 212a and 213a may be formed to a size corresponding to the width of the guide rib 216 but is not limited thereto. In other words, a width sufficient to stably support the slide rails 228 is sufficient.

In addition, one or more connection ports 217 may be formed to extend in the front and rear direction of the housing 21 at the upper end of the rear portion 214. The plurality of connection ports 217 may be disposed to be spaced apart at regular gaps in the width direction of the housing 21.

In addition, the support leg 215 may extend downward from the bottom portion 211 of the housing 21, and the lower end portion of the support leg 215 can be fixed to an upper surface of the case 11 of the cooking appliance 10 by the fastening member.

In detail, the support leg 215 may extend at four corners of the bottom portion 211 of the housing 21, or may extend only at the left and right edges of the rear end portion of the bottom portion 211.

Meanwhile, an upper end of the front surface of the left side portion 212 and an upper end of the front surface of the right side portion 213 can be connected by a connecting rib 219 extending with a predetermined width. The opening of the front end portions of the left side portion 212 and the right side portion 213 may be prevented by the connecting rib 219. In addition, the connecting rib 219 may be formed at a point higher than the upper end portions of the left side portion 212 and the right side portion 213.

In addition, a pair of power terminal portions 218 may be mounted on the rear portion 214. In detail, each of the pair of terminal portions 218 includes a contact terminal 218b, a terminal protection portion 218a for protecting the contact terminal 218b, and an elastic member 218c (see FIG. 14) disposed on the rear side of the contact terminal 218b.

In addition, a power supply cable extending from the control panel 13 may be connected to the contact terminals 218b.

In addition, when the drawer 25 is inserted into the housing 21, the terminal portion 34 provided on the rear surface of the drawer 25 is coupled to the power terminal portion 218, and the contents about this will be described in more detail with reference to the drawings.

Figure 9:
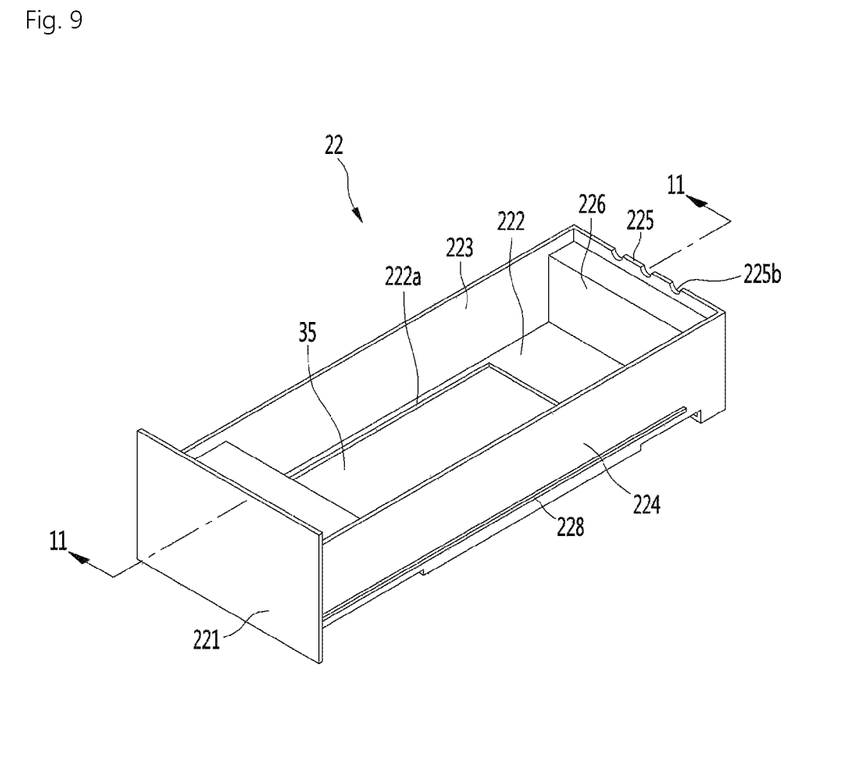
FIG. 9 is a front perspective view illustrating a case constituting the drawer of the steam generating device according to an embodiment of the present disclosure.
Figure 10:
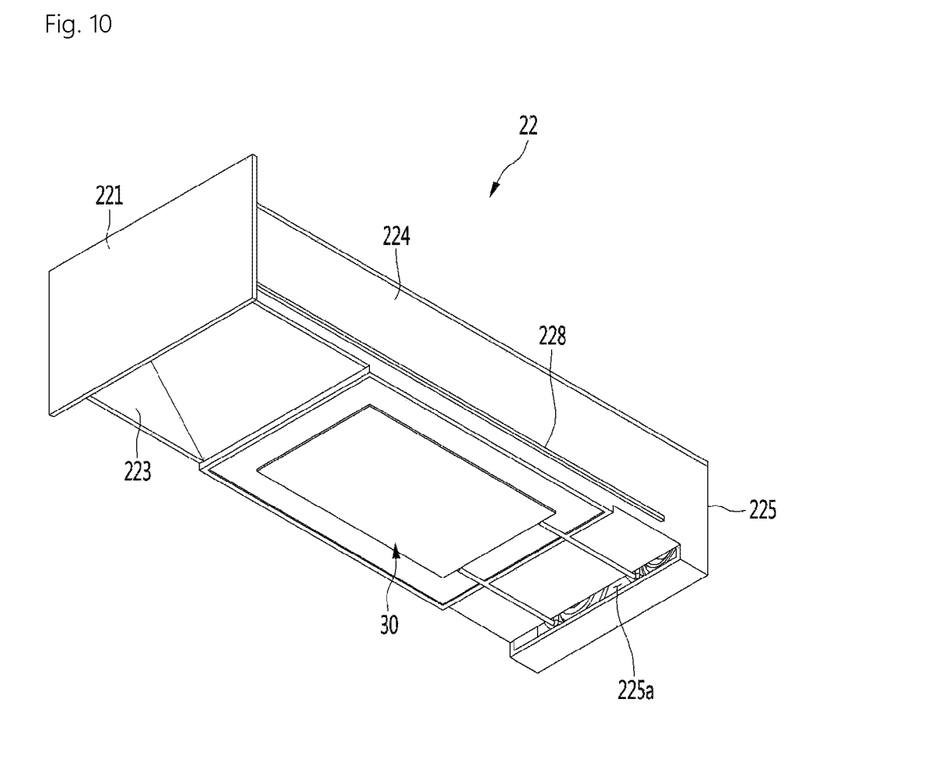
FIG. 10 is a bottom perspective view illustrating the case.
Figure 11:
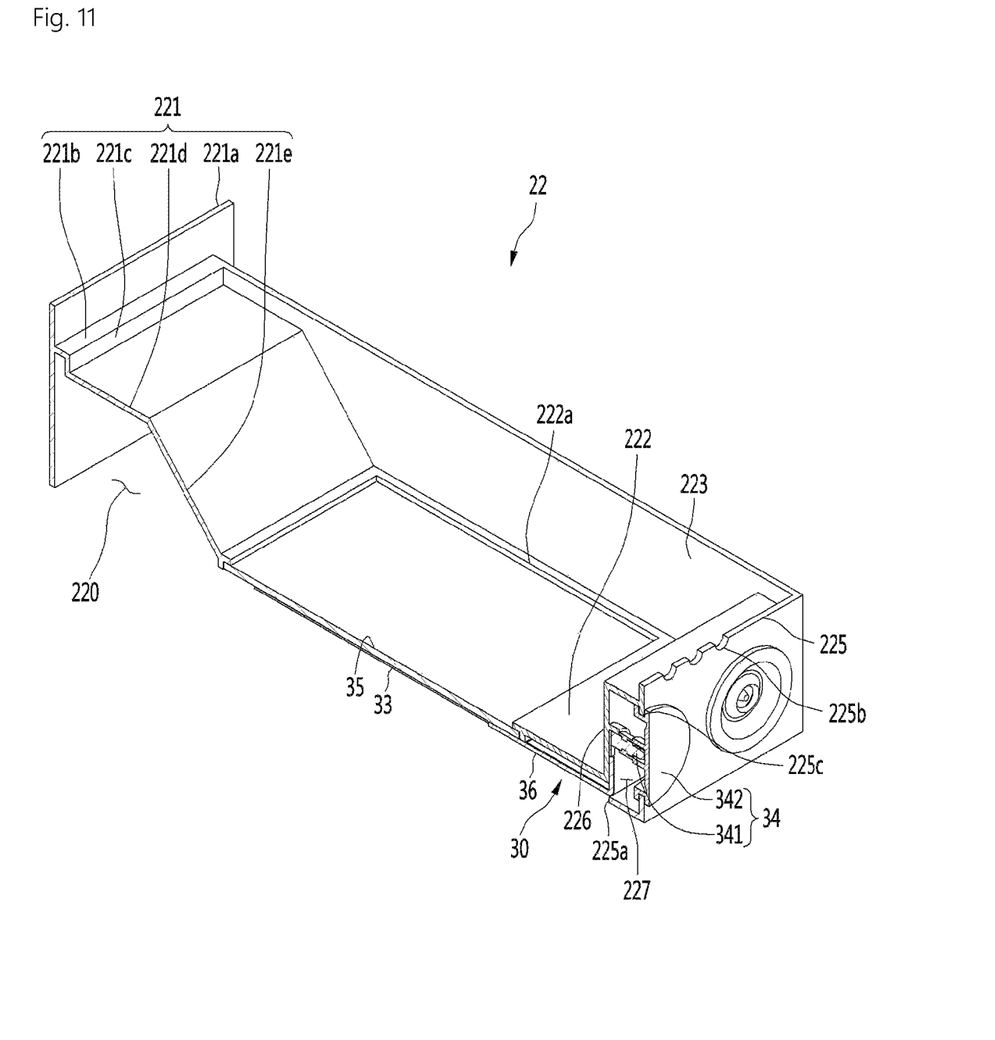
FIG. 11 is a cutaway perspective view illustrating the case taken along line 11-11 of FIG. 9.

FIG. 9 is a front perspective view illustrating a case constituting the drawer of the steam generating device according to an embodiment of the present disclosure, FIG. 10 is a bottom perspective view illustrating the case, and FIG. 11 is a cutaway perspective view illustrating the case taken along line 11-11 of FIG. 9.

Referring to FIGS. 9 and 11, the drawer 25 constituting the steam generating device 20 according to the embodiment of the present invention includes a case 22.

In detail, the case 22 includes a front portion 221, a left side portion 223 and a right side portion 224 extending vertically from the left and right ends of the front portion 221, a bottom portion 222 extending horizontally from the lower end of the front portion 221 to the rear side, and a rear portion 225 connecting the rear ends of the bottom portion 222, the left side portion 223, and the right side portion 224. The upper surface of the case 22 is opened.

In more detail, the front portion 221 includes a gripping portion 221a for gripping by the user by hand, a case cover seating portion 221b extending horizontally from the rear surface of the gripping portion 221a, a vertical portion 221c extending downward from the rear end of the cover seating portion 221b, a horizontal portion 221d extending horizontally from the lower end of the vertical portion 221c, and an inclined portion 221e inclinedly extending from the rear end of the horizontal portion 221d.

The inclined portion 221e is formed to be inclined at a predetermined angle in a direction away from the gripping portion 221a toward the lower side, and a gripping groove 220 is formed between the gripping portion 221a and the inclined portion 221e. By the gripping groove 220 being formed, it is possible to minimize the temperature rise of the gripping portion 221a due to the heat transferred from the inner case 23.

The gripping portion 221a completely closes the drawer insertion hole 151 formed in the decor panel 15 of the cooking appliance 10 when the drawer 25 is completely inserted into the housing 21. In other words, the gripping portion 221a and the drawer insertion hole 151 have the same shape and size.

The cover seating portion 221b is coplanar with a surface passing through the upper ends of the left side portion 223 and the right side portion 224, and the lower surface edge of the case cover 24 may be completely in close contact with the top surface of the case 22.

In addition, on the outer surface of the left surface portion 223 and the right surface portion 224, the slide rail 228 is formed to extend by a predetermined length in the front and rear direction. The slide rail 228 protrudes horizontally from the outer surface of the left side portion 223 and the right side portion 224 with a predetermined width.

The slide rail 228 may be formed at a point closer to the lower end than the upper end of the left side portion 223 and the right side portion 224. In addition, when the drawer 25 is withdrawn into or withdrawn from the housing 21, the slide rail 228 slides in a state of being seated on the guide jaw 212a and 213a formed on the left side portion 212 and the right side portion 213 of the housing 21.

In addition, a discharge port seating groove 225b may be recessed in an upper end of the rear portion 225.

In addition, a partition wall 226 may be formed on the front surface of the rear portion 225. In detail, the partition wall 226 may include a horizontal portion extending horizontally forwardly at a point spaced apart from the upper end of the front surface of the rear portion 225 by a predetermined distance downward, and a vertical portion extending from the end portion of the horizontal portion to the bottom portion 222. By this structure, a terminal portion receiving space 227 is formed between the rear portion 225 and the partition wall 226.

In addition, a pair of waterproof member mounting holes 225c are spaced apart in the width direction of the rear portion 225 at a point of the rear portion 225 that defines the rear surface of the terminal portion receiving space 227. The waterproof member 34 is fitted into the waterproof member mounting hole 225c. The cable 36 constituting the heating unit extends along a bottom portion 222 of the case 22 and a vertical portion of the partition wall 226.

Here, as illustrated in FIG. 10, a cable through-hole 225a may be formed at the rear side of the bottom portion of the case 22. The cable 36 extends through the cable through-hole 225a to the terminal portion receiving space 227. The contact terminal 341 is received in the terminal portion receiving space 227.

In addition, an opening portion 222a for mounting the heat conductive plate 35 may be formed in the bottom portion 222 of the case 22. The opening portion 222a is completely shielded by the heat conduction plate 35, and water supplied into the case directly contacts the heat conduction plate 35. Therefore, the water supplied into the case 22 is heated by being supplied with heat from the heat conduction plate 35 to be converted into water vapor.

The case 22 is made of a plastic material having low heat conductivity, and only the heat conductive plate 35 is made of a metal material having high heat conductivity, thereby minimizing heat loss through the surface of the case 22.

In addition, an opening portion is formed in the bottom portion 222a of the case 22, and since the opening portion 222a is shielded by the heat conduction plate 35, water receives heat directly from the heat conduction plate 35. Therefore, there is an advantage to minimize the heat loss generated during the heat transfer process.

However, without being limited to this structure, the case 22 is entirely made of a metal material, and the structure in which the planar heating element 33 is directly attached to the bottom of the case 22 may be possible. In other words, the planar heating element 33 may directly heat the bottom portion 222 of the case 22 through heat conduction.

By either way, since the planar heating element 33 does not directly contact water filled in the case 22, no scale is formed on the surface of the planar heating element 33.

Therefore, there is an advantage that the cleaning operation to remove the scale formed on the inner circumferential surface of the case 22 is much easier than the conventional steam generating device in which the heater is mounted inside the case.

Figure 12:
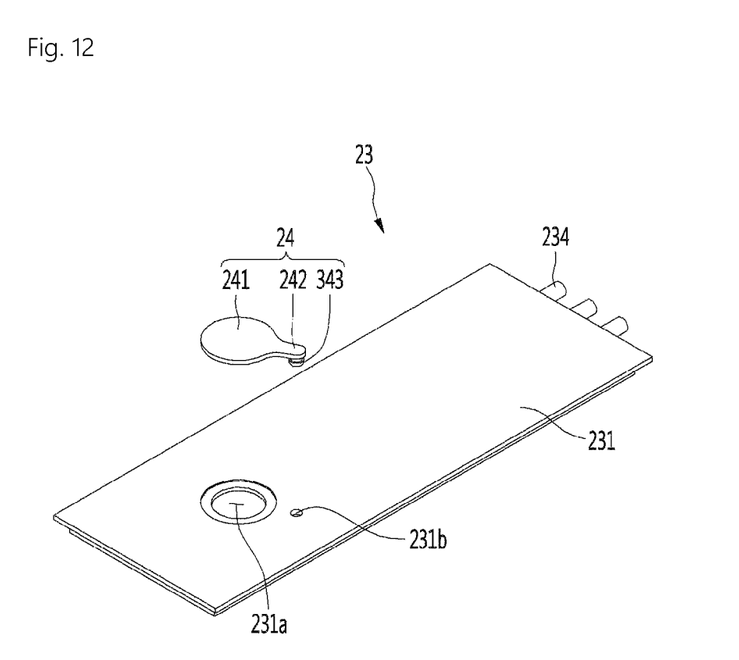
FIG. 12 is a perspective view illustrating the case cover and the injection hole cover constituting the drawer of the steam generating device according to an embodiment of the present disclosure.
Figure 13:
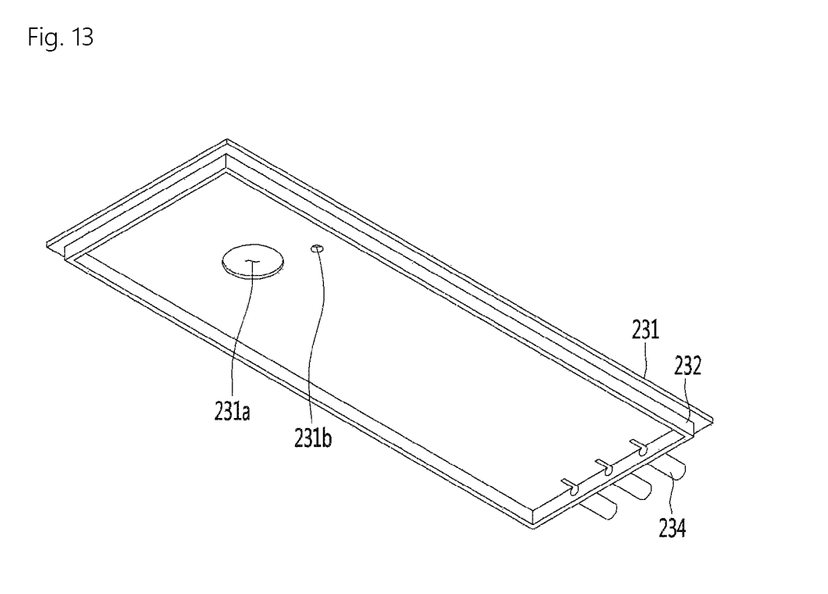
FIG. 13 is a bottom perspective view illustrating the case cover.

FIG. 12 is a perspective view illustrating the case cover and the injection hole cover constituting the drawer of the steam generating device according to an embodiment of the present disclosure, and FIG. 13 is a bottom perspective view illustrating the case cover.

Referring to FIGS. 12 and 13, the case cover 23 constituting the drawer 25 according to the embodiment of the present disclosure may include a cover plate 231 having a rectangular plate shape, an extension portion 232 extending at a point spaced inward from an edge of the lower surface of the cover plate 231, and a plurality of discharge ports 234 extending from the rear surface of the extension portion 232.

In detail, the extension portion 232 extends by a predetermined length at a point spaced apart from the front and rear end portions and left and right side end portions of the cover plate 231 by a predetermined distance in the center direction of the cover plate 231 and can be encircled by a rectangular band shape.

In addition, the plurality of discharge ports 234 may extend to the rear side from the rear surface of the portion of the extension portion 232 formed on the side of the rear end portion of the cover plate 231. The plurality of discharge ports 234 are inserted into the connection port 217 of the housing 21 when the drawer 25 is inserted into the housing 21.

In addition, when the case cover 23 is seated on the top surface of the case 22, the outer circumferential surface of the extension portion 232 is in close contact with the inner circumferential surface of the case 22, and the lower edge of the cover plate 231 is in close contact with the upper end portion of the case 22.

In addition, a water injection hole 231a is formed at one side of the cover plate 231, and the water injection hole 231a is opened or closed by the injection hole cover 24. A fastening hole 231b may be formed at a point spaced apart from an edge of the water injection hole 231a.

In detail, the injection hole cover 24 may include a cover body 241 that shields the injection hole 231a, an extension end 242 extending from an edge of the cover body 241, and an insertion protrusion 243 protruding from the lower surface of the end portion of the extension end 242. The insertion protrusion 243 is inserted into the fastening hole 231b formed in the case cover 23.

In addition, as illustrated, the edge of the injection hole 231a is formed to be stepped, and correspondingly the lower surface of the cover body 241 may be also formed to be stepped in a step shape.

Figure 14:
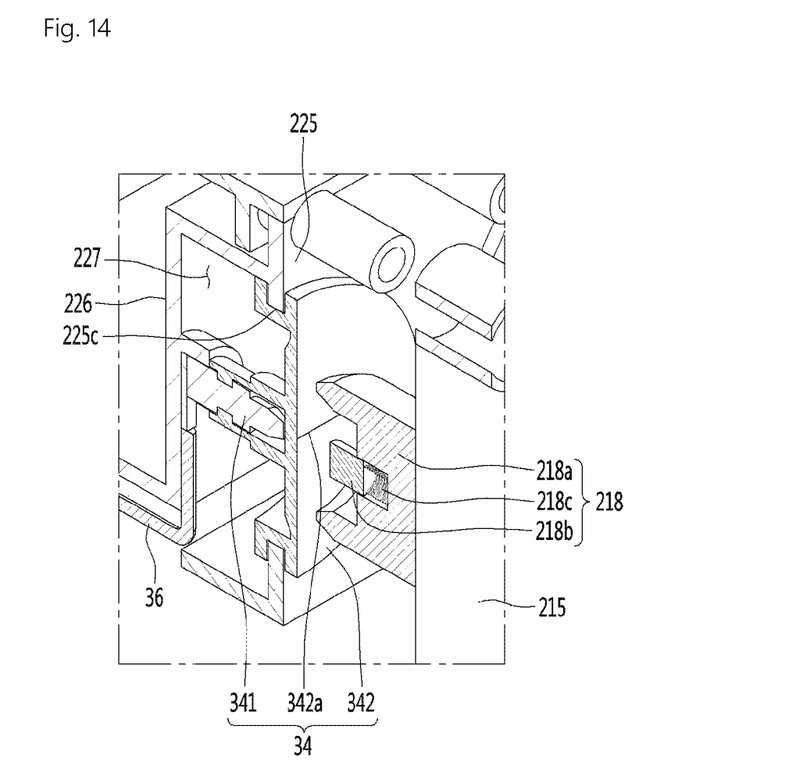
FIG. 14 is an enlarged sectional view of portion A in a state just before the drawer is fully engaged with the housing.
Figure 15:
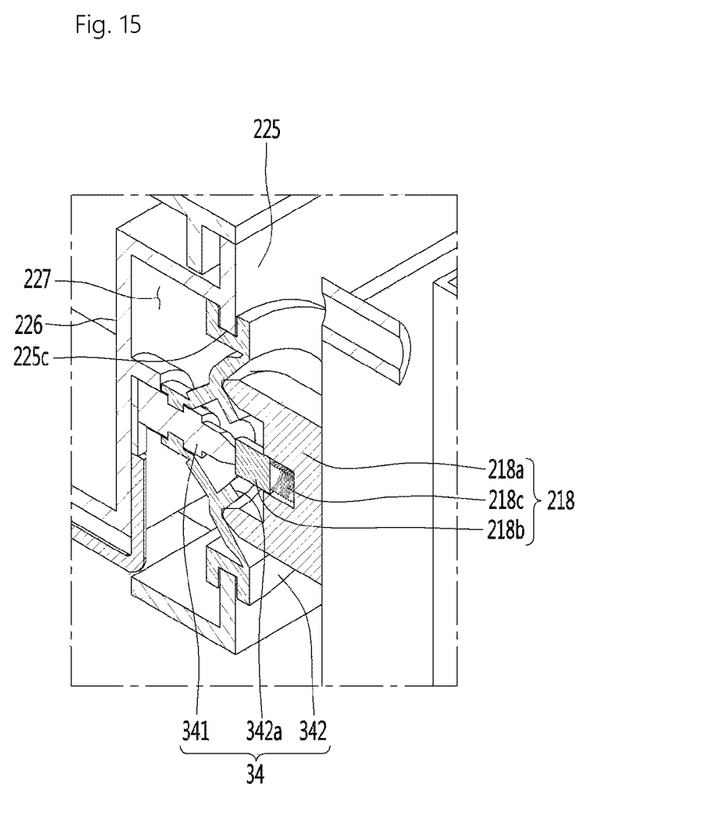
FIG. 15 is an enlarged sectional view illustrating portion A with the drawer fully engaged with the housing.

FIG. 14 is an enlarged sectional view of portion A in a state just before the drawer is fully engaged with the housing, and FIG. 15 is an enlarged sectional view illustrating portion A with the drawer fully engaged with the housing.

Referring to FIGS. 14 and 15, the power terminal portion 218 mounted on the rear portion 214 of the housing 21 may include a terminal protection portion 218a, a contact terminal 218b disposed at the center of the terminal protection portion 218a, and an elastic member 218c disposed at a rear end of the contact terminal 218b.

In detail, the front portion of the terminal protection portion 218a is recessed by a predetermined depth, and the contact terminal 218b is disposed at the center of the recessed portion. Accordingly, the contact terminal 218b may be protected from external shock by the terminal guard portion 218a.

In addition, a groove in which the elastic member 218c is received may be further formed at the center of the front surface of the terminal protection portion 218a. Therefore, when a pressing force is applied to the front surface of the contact terminal 218b, the elastic member 218c is contracted so that a portion of the rear end portion of the contact terminal 218b can be inserted into the groove in which the elastic member 218c is received.

Meanwhile, the waterproof member 34 is fitted into the waterproof member mounting hole 225c formed in the rear portion 225 of the case 22 as described above. In addition, the waterproof member 34 may include an inner lip 342b and an outer lip 342c.

In detail, the inner lip 342b encircles to protect the contact terminal 341 as illustrated and holds the contact terminal 341 so as not to be separated from the waterproof member 34.

The outer lip 342c may be formed on the opposite side of the inner lip 342b, and the outer lip 342c may be separated into a plurality of pieces by the slit 342a.

As illustrated in FIG. 14, since the slit 342a portion does not open in a state where the drawer 22 is not fully inserted into the housing 21, the contact terminal 341 is not exposed to the outside. In this state, since the contact terminal 341 is not exposed to steam or moisture, it is safe from an electrical accident.

As illustrated in FIG. 15, when the drawer 22 is completely inserted into the housing 21, the front end portion of the terminal protection portion 218a presses the rear surface of the waterproof member 34.

In detail, the slit 342a is opened while the shape of the waterproof member 34 is deformed by the force of the front end portion of the terminal protection part 218a pressing the rear surface of the waterproof member 34.

The end portion of the contact terminal 341 is exposed to the outside as the slit 342a is opened. In addition, an end portion of the contact terminal 341 passes through the slit 342a that is opened to contact the contact terminal 218b of the power terminal portion 218. Then, the power supplied through the power cable connected to the power terminal portion 218 is in a state capable of supplying the planar heating element 33.

Meanwhile, since the waterproof member 34 is made of elastic rubber or silicone material, even if the withdrawal operations of the drawer 25 are repeated a plurality of times, there is an advantage that the possibility of damage is lower than that of the plastic.

The invention claimed is:

1. A cooking appliance comprises:
a case that defines a cooking chamber therein;
a door configured to open and close a front opening of the case;
a steam generator mounted on an outer surface of the case; and
a steam supply tube that connects the steam generator and the cooking chamber to each other,
wherein the steam generator includes:
a housing fixed to the case,
a drawer withdrawably provided to the housing and configured to receive water for steam generation, and
a heater mounted on a lower surface of the drawer and configured to heat water in the drawer, and
wherein the heater includes:
a planar heating element including an insulating substrate and a heating resistor that is pattern-printed on the insulating substrate,
cables that extend from both end portions of the heating resistor, and
terminals respectively connected to end portions of the cables.

2. The cooking appliance of claim 1, wherein the drawer includes:
a case configured to receive water for steam generation;
a case cover that covers an upper surface of the case and that defines a water injection hole at one side of the case cover; and
an injection hole cover configured to open and close the water injection hole.

3. The cooking appliance of claim 2, wherein a bottom portion of the case includes:
a first surface that is in direct contact with water in the case; and
a second surface that is an opposite surface of the first surface, wherein the planar heating element is attached to the second surface, and wherein at least the bottom portion of the case is made of a metal material.

4. The cooking appliance of claim 2, wherein a bottom portion of the case defines an opening, wherein the opening is shielded by a heat conduction plate, wherein the heat conduction plate includes:
- a first surface that is in direct contact with water in the case; and
- a second surface that is an opposite surface of the first surface, wherein the planar heating element is attached to the second surface, and wherein the case is made of a non-metal material.

5. The cooking appliance of claim 2, further comprising:
power terminals mounted to a rear surface of the housing,
wherein the power terminals are electrically connected to the terminals based on the drawer being inserted into the housing.

6. The cooking appliance of claim 5, wherein each of the terminals includes:
- a case-side contact terminal connected to an end portion of each of the cables; and
- a waterproof member that encircles the case-side contact terminal to protect the case-side contact terminal, and wherein each of the power terminals includes:
- a terminal protector mounted on the rear surface of the housing; and
- a housing-side contact terminal protruding from a center of a front surface of the terminal protector so as to selectively be in contact with the case-side contact terminal.

7. The cooking appliance of claim 6, wherein the waterproof member includes:
- an inner lip that encircles the case-side contact terminal to protect the case-side contact terminal; and
- an outer lip that is disposed on an outer side of the inner lip and that defines one or more slits.

8. The cooking appliance of claim 7, wherein, when the drawer is completely inserted into the housing, a front end portion of the terminal protector presses a rear surface of the waterproof member, wherein, based on the rear surface of the waterproof member being pressed, the slits are configured to be opened while a shape of the waterproof member is deformed, and wherein the case-side contact terminal is exposed to an outside through the opened portion of the slits to contact the housing-side contact terminal.

9. The cooking appliance of claim 8, wherein, based on a force pressing the rear surface of the waterproof member being removed, the waterproof member is configured to be restored to an original shape thereof to close the slits.

* * * * *